United States Patent Office

3,578,616
Patented May 11, 1971

---

3,578,616
PROCESS FOR CURING POLYEPOXIDES AND RESULTING PRODUCT
Lawrence D. Harry, Midland, Mich., and George A. Sweeney, Erlenbach, Switzerland, assignors to The Dow Chemical Company, Midland, Mich.
No Drawing. Continuation-in-part of application Ser. No. 682,646, Nov. 13, 1968, which is a continuation-in-part of applications Ser. No. 480,128, Aug. 16, 1965, and Ser. No. 657,059, July 31, 1967. This application July 17, 1968, Ser. No. 745,364
Int. Cl. C08g *30/12*
U.S. Cl. 260—18
9 Claims

ABSTRACT OF THE DISCLOSURE

A process for curing a polyepoxide to obtain a clear colorless casting adaptible for optical applications comprising reacting:
  (A) a mixture of (1) epoxy resin and (2) hexahydrophthalic anhydride and
  (B) a curing catalyst composition comprising
    (1) an equal weight mixture of
      (a) a metal carboxylate e.g. Zn oleate, Zn or Sn–II 2-ethyl hexoate and Na salicylate
      (b) triphenyl phosphite
    (2) the product of reaction at 40 to 100° C. of $H_3PO_4$ with an aliphatic glycidyl ether in the presence of a solvent such as glycerine, polyethylene glycol or a glycerine initiated polypropylene glycol
    (3) an amount of hexahydrophthalic anhydride sufficient to bring the total in the system up to 40 to 100 parts by weight of polyepoxide.

RELATIONSHIP TO OTHER APPLICATIONS

The instant specification and claims constitute a continuation-in-part of our co-pending application Ser. No. 682,646; filed Nov. 13, 1968, which, in turn, is a continuation-in-part of, jointly, our co-pending application Ser. No. 480,128, filed Aug. 16, 1965, and of our also co-pending application Ser. No. 657,059, filed July 31, 1967, all of the above earlier filed applications are now abandoned.

BACKGROUND OF THE INVENTION

Field of the invention

This invention relates to a process for curing polyepoxides. More particularly, the invention relates to a process for curing a polyepoxide by causing it to react with an epoxy-curing acid anhydride, using a novel curing system composition: and to the resulting clear, colorless cured epoxy resin products.

In more particular, the invention provides a process for curing and resinifying polyepoxides containing an average of more than one 1,2-epoxyalkyl group per molecule, and preferably the glycidyl polyethers of phenols; which comprises mixing and reacting the polyepoxide with a resinifying amount of an acid anhydride curing agent for an epoxy resin, optionally, in the presence of other reactive additives, under the catalytic influence of a curing system composition comprising essentially an organo-metallic curing accelerator and an acceleration inhibitor consisting essentially of the reaction product of phosphoric acid with a less than entirely stoichiometric amount of an aliphatic glycidyl ether. The invention further provides cured products obtained by the present process which are characteried by their excellent hardness, durability and freedom from color. Because of their transparency and freedom from striation, as well as other necessary properties such as hardness and dimensional stability, they are especially adapted to optical applications such as lenses.

PRIOR ART

It is known that acid anhydrides may be used by themselves as curing agents for such polyepoxides as the glycidyl polyethers of polyhydric phenols: indeed, for poly 1,2-epoxyalkyl compounds generally: U.S. 2,324,483 and also 16 J. Polymer Sci. 201–208 (1955) by Dearborn et al. Products obtained by the curing of a polyepoxide by an anhydride alone are sometimes deficient, particularly as to color and internal flaws.

It is also known to use "special" activators to cure a polyepoxide with an anhydride; such activators as organo-substituted phosphines, arsines, stibenes and bismuthines. Although some of these activated anhydride cured polyepoxides tend to cure at room temperature, the resultant cast products usually exhibit marked evidence of striation and coloration. "Striation" as here used refers to lamellar to laminar to zonal variation in refractive index, of a transparent, refractive material, whereby it is rendered unsuitable for use as transmitting to refracting material in pecise optical elements. Especially, in large castings, heat of curing reaction has tended to leave serious flaws in the cured structure. In many applications, it is desirable to have large, hard, scratch-resistant, completely colorless cast resin products free from optical flaws. Heretofore known processes were incapable of producing such cast resin products.

Carboxylic acid anhydrides, activated by, for example, organophosphine compounds are taught in U.S. Pat. 2,768,153 to be used in curing polyepoxides. Reaction products of phosphoric acid with, for example, alkyl glycidyl ethers, are set forth in U.S. Pat. 3,245,940. Tri-organophosphite compounds are set forth in British Pat. 903,933, issued in August 1962.

DESCRIPTION OF THE PRESENT INVENTION

It has now been discovered that practically colorless, substantially flaw-free transparent cast resin products ranging in size from very large to very small may be produced by a process of curing a polyepoxide having an average of more than one 1,2-epoxyalkyl groups per molecule, which comprises mixing and reacting the polyepoxide with an acid anhydride curing agent for an epoxy resin, the reaction being catalyzed by a curing system comprising essentially a catalyst modifier that is a reaction product of phosphoric acid and an aliphatic glycidyl ether; and an organo-metallic curing accelerator compound. It has been found that when the anhydride is used to cure a polyepoxide under the influence of a catalyst system comprising the above-noted phosphate ester and organo-metallic accelerator it displays good, but surprisingly moderate and uniform activity as a curing agent for a polyepoxide. One of the most important advantages of the present invention is found in the fact that the products obtained are greatly improved in freedom from the discoloration and physical flaws that are oftentimes present in other anhydride cured products, while yet retaining the good hardness and scratch resistance that are characteristic of epoxy resins generally. Above all, the present process can be used to make large castings which have the same desirable properties as smaller castings.

The carboxylic acid anhydride curing agents possess at least one anhydride group, that is, a

group when such group is bonded to adjacent or connected carbon atoms of a chain, or ring, a cyclic or bicyclic product exists.

In a preferred embodiment, the carbon atoms of at least one such anhydride group are bonded to an aliphatic moiety in such manner that at least as to the aliphatic moiety and the anhydride group, a cyclic structure exists.

In the best practice of this invention to the present time, the acid anhydride has been the anhydride of 1,2-cyclohexane dicarboxylic acid, commonly called "hexahydrophthalic anhydride." However, other acid anhydrides useful as curing agents for polyepoxides also give good results, especially those that are normally liquid or of low melting temperature, such as those mentioned in the patents above designated. The heart of the invention is not a matter of the identity of the anhydride, but the cure of an anhyride-polyepoxide mixture with the curing system of the invention, and the resulting products.

The curing system composition of this invention necessarily comprises two components, advantageously contains a third or third and fourth, and may comprise more although in the latter instance, the additional components are optional as to this invention.

The necessary first component is an organophosphate ester which is believed to act as a reactive partial inhibitor for a cure accelerator: and the necessary second component is a cure accelerator such as the phosphate ester inhibits, and more particularly a metal-organic cure accelerator.

The desirable third and fourth components are solvent carriers to assist in thorough and uniform dispersal of metal-organic cure accelerator; and light stabilizer. As it is envisioned that the instant compositions are unusually useful in optical systems and the like, a light stabilizer is sometimes deemed highly desirable. Sometimes, one and the same substance may act as solubilizing carrier for cure accelerator and inhibitor of light degradation in the cured product.

The phosphate ester is the conventional reaction product of phosphoric acid and an aliphatic, and typically an alkyl, glycidyl ether that are supplied to the reaction in, typically, a molar ratio of from about 0.3 to about 3.5 molar proportions of glycidyl ether to one molar proportion of phosphoric acid, actual. The resulting product manifests a portion, for example a fourth to a half, of the acidity of the original acid. The exact ester structure is not known, and an exact acidity level is not believed to be critical.

The glycidyl ether that is now believed to be most preferable is butyl glycidyl ether. However, glycidyl ethers of aliphatic groups, and more particularly alkyl groups from 1 to about 16 carbon atoms can be employed, such as methyl glycidyl ether, ethyl glycidyl ether, tertiary butyl glycidyl ether, octyl glycidyl ether, dodecyl glycidyl ether, and eicosyl glycidyl ether.

The phosphoric acid and glycidyl ether are preferably reacted together at the lowest practicable temperatures such as from about 40 to about 100° C. and preferably in the presence of a solvent. It is desirable that the employed solvent be one which has relatively high solvent power for the employed materials but yet be reactive in a curable polyepoxide/anhydride system. In this situation, solvent need not be removed, but can be left in the resulting product, to disappear in the curing of the resin. Numerous solvents are of such reactivity, and the criteria for their selection are numerous.

It is believed that the function of the solvent material is as a heat-sink on the molecular or near molecular level. It is believed that transient high exotherm at or near the molecular level can lead to undesired side products. Thus, good heat conductivity and relatively high specific heat are desired attributes, and a solvent of all the desired properties is readily available, and can be selected from published data on solvents.

Good results have been obtained when employing a polyglycol or a tris polyalkylene oxide ether of a triol, such as the tris ether of glycerine obtained by reaction with about 10 moles of propylene oxide. Glycerine itself has been used. The polyglycol triol reaction medium, commercially a Voranol, is the preferred solvent for this purpose. The preferred polyglycol is a polyethylene glycol of molecular weight 500–1000, preferably about 700.

The organo-metallic catalyst of the accelerator type is selected from known nuch materials including zinc oleate, stannous 2-ethylhexoate, and sodium salicylate. Zinc 2-ethylhexoate, commonly called "zinc octoate" is the preferred accelerator in this invention.

Solvent carriers for the accelerator materials are well known; lower alkylene glycols are often useful. Lower alkyl ethers of such glycols are employed. For example, diethylene and dipropylene glycol are so employed with good results, as are the methyl, ethyl, and propyl monoethers of the named glycols. A most preferred solvent material has been triphenyl phosphite. In addition to excellent solvency, it has value as a light stabilizer in the cured epoxy resin.

The cured epoxy resins generally, and those of the instant invention, are themselves useful as light stabilizers in other plastic substances susceptible of ready degradation under the influence of light. For example, epoxy resins, or their curable precursors, have been incorporated into polyvinyl chloride, to stabilize it against its known tendency towards light degradation. However, in common with organic matter generally, prolonged or intense exposure of an epoxy resin to ultraviolet and other highly actinic radiation in the presence of air or oxygen can result in some degradation that may be manifest by darkening.

When it is desired to stabilize the product of this invention against such degradation, phosphites may be the materials of choice; but other molecules having moieties that respond with resonant motion at ultraviolet wave lengths are also used with good results. Representative teachings thereto are found in U.S. Pats. 2,126,179; 2,364,027; and 2,617,748. These patents, together with the references cited in their prosecution, are hereby expressly incorporated and made part of the instant specification for their teaching, generic and specific, of the stabilization of organic matter from ultraviolet and like radiation. Other substances are well known and are considered to be part of all patent specifications without citation.

The polyepoxide resin employed may be any of the liquid 1,2-polyepoxides known in the art. Many of them are commercial products and readily available on the market. In general, representative materials are prepared in the known manner from 2,2-bis(4-hydoxyphenyl) propane with an excess of epichlorohydrin in the presence of sodium hydroxide. In the production of a cured epoxy resin of good optical properties for the transmission of light, a colorless or nearly colorless polyepoxide will be preferred. We prefer to use such a liquid polyglycidyl ether of 2,2-bis(4-hydroxyphenyl)propane which has an epoxy equivalent weight of about 172 to 178, and is substantially colorless.

The novel curable compositions are preferably prepared as a two component system, namely, (A) the resin, optionally containing a portion of the acid anhydride curing agent and (B) the curing catalyst system composition. The ratio of components for (A) is most advantageously: 100 parts by weight of the liquid polyepoxide and from zero to 100, preferably about 70, parts by weight of the anhydride. The resulting mixture should be a liquid, as is the following curing system.

The curing catalyst system composition (B) comprises essentially (1) About 3 to 65 weight parts by weight of said curing catalyst system composition of an organo-metallic curing accelerator for a curable acid anhydride and polyepoxide system and (2) About 25 to 70 weight parts by weight of said curing catalyst system composition of an acid-ether reaction product of about 1 molar proportion of phosphoric acid with from about 0.3 to about 3.5 molar proportions of an aliphatic glycidyl ether and optionally but not always preferably (3) An acid anhydride curing agent for an epoxy resin in such amount that, together with amount of acid anhydride curing agent for an epoxy resin added to resin mixture (A) said anhydride of a total amount of from 40 to 100 parts by weight of polyepoxide.

Of the entire said curing catalyst system composition (B) excepting anhydride (3), there are employed from one to thirty weight parts per hundred weight parts polyepoxide in said resin mixture (A). Actual total proportion of (B) employed is adjusted according to the amount of anhydride in it.

When the polyepoxide is mixed with the acid anhydride as described, to obtain composite resin (A); and when the curing catalyst system composition (B) is formulated with no anhydride they can be held, separately, for indefinite periods of time, and retain their usefulness.

To cure the product to obtain the superior epoxy resins of this invention it is necessary to mix composite resin (A) and curing catalyst system composition (B) together thoroughly and to heat the resulting mixture through a cure cycle.

To obtain clear, striation-free castings, the resin and curing catalyst system composition should each be heated to a temperature in the range of 120° to 200° F., for example about 170° F. before mixing together. Such heating reduces viscosity and conduces to better optical properties and freedom from air bubbles.

Optical system members, such as lenses or elements of compound lenses, prisms, plates, filters, and the like, can oftentimes advantageously be made of the resins of this invention by providing a mold with release surfaces adapted to receive and hold the uncured resin composition and confer upon it a desired shape as it cures, said mold having surfaces that are the inverse of the desired optical surface, as to curvature, smoothness, and the like. Thus it is possible, given the mold and, presumably a release agent coating of insignificant thickness, to produce optical lenses and the like of good quality by casting. Hydrocarbon "mineral" oil, a poly(loweralkyl siloxane) oil, or polytetrafluoroethylene are such agents and the use of such assures a release surface. Release agents of U.S. Pat. 2,811,408 also give good results.

However, the present materials can be used in manner analogous to the use of optical glass. That is, the present epoxy resins can be cured in a pot or the like, the pot broken away, and the resin itself then broken and, from the broken pieces, lenses and the like can be ground in the manner known for optical glass. In such application, the instant resins are found to be substantially more difficult to break into grindable fragments. It may be desired to saw or otherwise subdivide the pot resin.

The cure cycle selected for large castings will depend on various factors including the cross-sectional area, mass and general shape of the casting. In common with good epoxy resin curing practice generally, it will usually be preferred first to heat the curable polyepoxide mixture until it reacts to the "gel" stage. After a stable gel stage is attained, a final cure is then to be performed, usually at a high temperature.

In studies of the curing of castings characterized by appreciable depths, or heat paths for heat of curing and escape of exotherm, if any, spherical castings have been considered representative. In them, the shortest heat path to the greatest depth is a radius and is uniform; a zone at the center of the sphere represents the locality in which non-uniformity and the like are to be sought, if at all. So, it is, that spherical castings have been studied and are reported here.

In spherical castings, castings up to about 3 to 4 pounds are usefully gelled at 170° F. Castings up to about 12 to 14 pounds are gelled at 160° F., while even larger castings respond well to a 150° F. gel temperature. Thin sheets or small castings can be gelled at temperatures up to 300° F. A gel time of 16 hours may be required for all except very small castings.

It is believed that the optical excellence of products of this invention is related in some way to the extended cure times required, and it is believed that the absence of epochs of extreme reactivity is necessary.

A firm gel should be obtained before the temperature is raised for the final cure. Because the heat transfer through a large casting is slow, it is preferred to raise the temperature gradually, and optionally stepwise during gellation. The temperature increases and duration of holding at each step will be determined, in practice by simple, range finding tests. The time and duration will vary as a function of thickness of the thickest portion of the intended casting, rate of gel reaction of the chosen curable polyepoxide mixture, and other well-known factors. The temperature increases per step and the duration of holding at such temperature are not at the heart of this invention.

A typical cure schedule for a medium size casting is: (1) heating the resin and hardener mixture for 16 hours at 170° F., (2) then 4 hours at 212° F., and (3) for 4 hours at 250° F.

In common with epoxy resins, generally, the composition of this invention, or a composition prepared according to the process of this invention, is adapted to many uses. When optical properties are unimportant, the composition can be used with dark resins including opaque to translucent resins, for coatings, adhesives, structural and electrical parts and the like.

These resins can also be filled. When optical properties are unimportant,, they can have any of the conventional fillers. When optical properties are to be maintained, it will be essential and critical that the filler be colorless or nearly so, transparent, and of a refractive index identical with or indistinguishable from the refractive index of the cured resin of the instant invention. When desired for decorative visual effect, the composition can have a coarsely particulate filler which can be colored or transparent but of refractive index distinctly different from that of the instant epoxy resin. The use of filler is, in any event, optional.

The following examples illustrate the best practices now known to the inventors, of curing of a liquid polyepoxide with the curing system of the present invention.

DESCRIPTION OF THE PREFERRED EMBODIMENTS

Example 1

A catalyst modifier was prepared by combining 20 grams of 85 percent phosphoric acid, and, as solvent, 20 grams of a polyether triol reaction product of glycerine with about 10 moles of propylene oxide ("Voranol CP 700") and the resulting mixture placed under nitrogen blanket and in a water-jacketed reaction vessel adapted for cooling. Thereto, with continuous cooling and with thorough mixing and stirring, over a period of about an hour, were added 30 grams butyl glycidyl ether. Reaction occurred, the nature of the reaction being incompletely known, and water was evolved, although it may in part or entirely have been from the water content of the phosphoric acid.

Upon completion of the addition of the butyl glycidyl ether, the resulting warm mixture was placed under sharply subatmospheric pressure ("vacuum") and water removed by vaporization. These procedures obtained between 30 and 40 grams of reaction product, as a colorless, mildly acidic phosphate ester.

An epoxy resin curing system formulation was prepared by taking 10 grams of the modifier as above described and combining it with intimate mixing and stirring with 50 grams of a commercial hexahydrophthalic anhydride and with 5 grams of a commercial accelerator comprising essentially about half, by weight, zinc 2-ethylhexoate as accelerator and half, by weight, triphenyl phosphite as solvent and light stabilizer.

Of the curing system formulation thus obtained, 55 grams were taken, and mixed intimately with 100 grams of a prepared, hardenable resin. The prepared, hardenable resin was prepared by combining 100 grams of a commercial 2,2-bis(p-(2,3 - epoxypropoxy)phenyl)propane ("diglycidyl ether of bisphenol A," also known as D.E.R. 332), with 20 grams of hexahydrophthalic anhydride. In the instant preparation visual examination of the resin disclosed a faint yellow-brown discoloration. This was countered by the addition of a trace—on the order of a milligram—of Perox Blue dye. The dye was optional and is not regarded as part of the invention.

Of the prepared resin, 100 grams was taken for reaction with 55 grams of the curing system formulation. The substances were liquid as prepared. In use, each was separately heated to about 170° F. to reduce viscosity. Care was taken in all procedures to avoid inclusion of air bubbles and to assure thoroughness of all mixing. After heating, they were mixed together and poured into a mold. In the mold the resin was gelled by holding at 150° F. for 20 hours, and thereafter cured by holding for four hours each at temperatures of 175, 212, and 250° F., successively. The product was then cooled, removed from the mold, examined, and found to exhibit very superior optical properties. It was hard and highly scratch-resistant, had excellent properties of transmission of visible light, and a refractive index closely comparable with that of optical glasses.

Example 2

The present example repeated essentially Example 1, foregoing, except that the amounts were increased. The total weight of the finished casting was approximately 16 pounds and it was cast as an approximately true sphere. Whereas prior art castings of this size would have been expected to show internal structural damage from heat of reaction to such extent as to be optically useless, the casting here prepared was substantially free from optical flaws.

The said casting was, upon one occasion, inadvertently left on the rear seat of a closed automobile in such position that sunlight passed through the automobile window and struck the the sphere squarely. The sphere focused it to a small spot of intense heat, igniting the automobile seat material. Unattended, the resulting flame propagated sufficiently to damage the seat past repair but then died out, as flame retardant materials had been used in the seat.

At another time the said sphere was left on a small wooden table in a house, near a window. Sunlight struck it squarely and was focused to a spot of intense heat, seriously damaging the table finish and charring a large spot of its wood.

Example 3

In preparing the curing system (B), for use in curing liquid polyepoxides in accordance with the present invention, the following mixture was prepared.

Into a suitable reaction vessel was added 240 grams of 85 percent $H_3PO_4$, and 240 grams of polyether triol of an alkylene oxide having a molecular weight of 640 to 770 and a hydroxyl number of 218 to 263 (reaction product of propylene oxide and glycerine). The balance of the $H_3PO_4$ material above 85 percent actual, was water.

The mixture was maintained at 170° F. under a nitrogen atmosphere and 360 grams of butyl glycidyl ether was added, with stirring, over a 6-hour period. The rate of addition was controlled to prevent the temperature from exceeding 170° F.

After addition of the butyl glycidyl ether was complete, the product was vacuum treated to remove any water, residual butyl glycidyl ether, or other volatile matter.

The alkylene oxide polyether triol was permitted to remain in the resulting product as employed.

One hundred twenty-five grams of the above product was warmed to 130° F. and blended with 25 grams of a commercial zinc octoate accelerator dissolved in 25 grams triphenyl phosphite, to complete the curing catalyst system composition.

Seven hundred grams of hexahydrophthalic anhydride was warmed to 130° F. and added to the curing catalyst system composition and stirred until clear to obtain a finished curing system blend.

Example 4

A cured epoxy resin was prepared by mixing: (B) 875 grams of the curing system blend from Example 3 with (A) 1000 grams of the diglycidyl ether of 2,2-bis(4-hydroxyphenyl)propane having an epoxy equivalent weight of about 172, and here containing no anhydride curing agent.

The two parts, (A) and (B), were each separately heated to about 170° F. and admixed together, poured into a suitable casting mold and held at 150° F. for approximately 20 hours. Thereafter, the mixture was heated at about 175° F. for 4 hours, then at 212° F. for an additional 4 hours, and finally for 4 hours at 250° F. When allowed to cool to room temperature the cured, cast resin had the following properties, as shown in Tables I and II.

TABLE I

Physical properties of cured epoxy resin

| | |
|---|---:|
| Heat distortion temp., ° C. | 106 |
| Tensile strength, p.s.i. | 11,300 |
| Percent elongation | 4.0 |
| Tensile modulus, p.s.i. | 481,000 |
| Compressive strength | 16,300 |
| Deformation at yield point, percent | 5.8 |
| Compressive modulus | 430,000 |
| Flexural strength | 14,600 |
| Deflection at break, inches | 0.43 |
| Flex modulus | 421,000 |
| Izod impact, ft.-lbs./inch of notch | 0.40 |
| Rockwell M hardness | 101.8 |
| Refractive index [1] | 1.549 |

[1] Refractive index of glass—1.52–1.56.

TABLE II.—LIGHT TRANSMISSION OF THE CURED EPOXY RESINS

| | Percent transmission | | |
|---|---|---|---|
| | Cured resin | | Pyrex glass |
| | 175 mils | 285 mils | 2 mm. |
| Wavelength (A.): | | | |
| 7,000 | 88.5 | 89.5 | 91.9 |
| 6,500 | 85.2 | 87.0 | 91.9 |
| 6,000 | 83.2 | 85.0 | 91.9 |
| 5,500 | 83.0 | 85.0 | 91.8 |
| 5,000 | 82.5 | 85.0 | 91.8 |
| 4,500 | 81.0 | 82.8 | 91.5 |
| 4,000 | 75.9 | 75.9 | 91.3 |

The small differences between the two thicknesses of the cured epoxy resin indicated that most of the light absorption from 400–700 angstroms is due to surface scratches and abrasions. Discs with optically true surfaces would be expected to approach Pyrex glass in clarity.

Example 5

Twenty weight parts of polyethylene glycol of molecular weight about 700, average, are placed in a capacious reaction vessel. To the glycol in the vessel are added twenty weight parts phosphoric acid of 85 percent actual. Acid of higher or lower titer can be used, making allowance for water. The resulting mixture is stirred and to it are added, with continued stirring, 30 weight parts 1,2-epoxy-3-butoxypropane. Making allowance for the natural exothermy of the reaction, the resulting reaction mixture is maintained at a temperature between about 50 and about 70° C. Stirring is maintained until a homogeneous mixture results and no further reaction takes place.

Thereupon, to the resulting reacted mixture are added 35 weight parts of the commercial accelerator by weight half zinc octoate dissolved in half triphenyl phosphite as hereinbefore described, while maintaining the said temperature. The resulting mixture is stirred until, again, a clear, homogeneous solution results, and thereupon the resulting mixture is placed in a vacuum oven and maintained at a moderately elevated temperature to remove water. That accomplished, the curing system is ready for use.

In other embodiments, exactly the same procedures are carried out except that the 1,2-epoxy-3-butoxypropane is added in a different amount in each embodiment. Amounts employed in diverse embodiments are, respectively, 12, 18, 24, the 30 weight parts hereinbefore described, and 36 weight parts. Best results are obtained when employing the 30 weight part mixture; results which appear to differ only in requisite cure times and cure exothermy, are judged satisfactory when employing the embodiments with smaller and larger amounts of the 1,2-epoxy-3-butoxypropane compound.

Use of the instant curing system is illustrated in the following preferred embodiment.

Example 6

One hundred weight parts of a highly purified, colorless, liquid 2,2-bis-4-(2,3-epoxypropoxy)phenyl propane ("diglycidyl ether of bisphenol A") is mixed and blended with 70 weight parts of the cyclic anhydride of 1,2-cyclohexanedicarboxylic acid ("hexahydrophthalic acid anhydride"). To the resulting mixture are added 17 weight parts of the catalyst composition of this invention as hereinbefore described under the first description of a preferred embodiment. The resulting mixture is stirred to render it homogeneous. The resulting mixture is a clear, colorless liquid somewhat more viscous than water. It is adapted to be formed in liquid-tight molds into shapes of great complexity and diversity, and to be given an exact shape such as the shape of an optical member.

The resulting polyepoxide is latent cured, in the sense that, at room temperatures, it remains uncured with only negligible increase in viscosity for a week or longer; it precures to an immobile gel at 100° C. in from 2 to 4 hours, and is finished with, typically, 4 hours cure at 125–150° post cure. It is noted that ultimate curing temperatures are relatively low, and that the resins cured according to this invention are unusually well adapted to be used for coating, potting and the like of heat-sensitive units.

We claim:

1. Process of curing a polyepoxide to obtain an epoxy resin, which comprises the steps of combining and mixing together
   (A) a resin mixture comprising essentially a liquid polyepoxide and, per hundred weight parts of polyepoxide, from 0 to 100 parts by weight of hexahydrophthalic acid anhydride curing agent for an epoxy resin and
      from one to thirty weight parts per hundred parts by weight of said polyepoxide, of
   (B) a curing catalyst system composition comprising essentially
      (1) about 3 to 65 parts by weight of said curing catalyst system composition of a metal carboxylate curing accelerator for a curable acid anhydride polyepoxide system
         said carboxylate being zinc oleate, stannous 2-ethylhexoate, sodium salicylate, zinc 2-ethylhexoate, or mixtures thereof
         said carboxylate being in solution in triphenyl phosphite of an amount approximately equal in weight to that of said carboxylate, and
      (2) about 25 to 70 parts by weight of said curing composition of a product of reaction at about 40 to about 100° C. of
         about 1 molar proportion of phosphoric acid and
         from about 0.3 to about 3.5 molar proportions of an aliphatic glycidyl ether in the presence of a solvent that is a polyglycol of molecular weight of about 500 to 1000, glycerine, or a tris polyalkylene oxide ether of a triol and
      (3) hexahydrophthalic acid anhydride in an amount from 0 to 100 weight parts per hundred weight parts of polyepoxide in resin mixture A, with the further limitation that, together with amount of said acid anhydride added to resin mixture A it is of a total amount of from 40 to 100 parts by weight of polyepoxide, and thereafter heating said mixture through a curing cycle.

2. Process of claim 1 which comprises also the step of preheating mixtures A and B separately to a temperature above ambient but below boiling temperature thereof, prior to combining said mixtures A and B, and
   combining heated mixtures A and B, and pouring combined mixture into a mold and
   heating to gel and subsequently to cure the said mixture in substantially the shape defined by the said mold.

3. Process of curing a polyepoxide to obtain an epoxy resin which comprises the steps of combining and mixing together
   (A) a resin mixture comprising essentially a liquid polyepoxide and, per hundred weight parts of polyepoxide, from 0 to 100 parts by weight of hexahydrophthalic acid anhydride curing agent and
      from one to thirty weight parts per hundred parts by weight of said polyepoxide, of
   (B) a catalyst curing system composition consisting essentially of
      (1) about 3 to 65 parts by weight of said catalyst curing system composition of a metal carboxylate curing accelerator for a curable acid anhydride polyepoxide system,
         said carboxylate being zinc oleate, stannous 2-ethylhexoate, sodium salicylate, zinc 2-ethylhexoate, or mixtures thereof
         said carboxylate being in solution in triphenylphosphite of an amount approximately equal in weight to that of said carboxylate, there being present a stabilizer to inhibit light degradation of the cured product; and
      (2) about 25 to 70 parts by weight of said catalyst curing system composition of a product of reaction at about 40 to about 100° C. of
         about 1 molar proportion of phosphoric acid and
         from about 0.3 to about 3.5 molar proportions of an aliphatic glycidyl ether in the presence of a solvent that is a polyglycol of molecular weight of about 500 to 1000, glycerine, or a tris polyalkylene oxide ether of a triol and
      (3) an acid anhydride curing agent for an epoxy resin in such amount that, together with amount of acid anhydride curing agent for an epoxy resin added to resin mixture A it is of a total amount of from 40 to 100 parts by weight of polyepoxide, and thereafter heating said mixture through a curing cycle.

4. Process of claim 3 which comprises also the step of preheating mixtures A and B separately to a temperature above ambient but below boiling temperature thereof, prior to combining said mixtures A and B, and combining heated mixtures A and B, and pouring combined mixture into a mold and heating to gel and subsequently to cure the said mixture in substantially the shape defined by the said mold.

5. Process of curing a polyepoxide to obtain an epoxy resin which comprises the steps of combining and mixing together (A) a resin mixture comprising essentially a liquid polyepoxide and, per hundred weight parts of polyepoxide, from 0 to 100 parts by weight of hexahydrophthalic acid anhydride curing agent for an epoxy resin and from one to thirty weight parts per hundred weight parts of said polyepoxide, of (B) a catalyst curing system composition comprising essentially (1) about 3 to 65 parts by weight of said catalyst curing system composition of a metal carboxylate curing accelerator for a curable acid anhydride polyepoxide system, said carboxylate being zinc oleate, stannous 2-ethylhexoate, sodium salicylate, zinc 2-ethylhexoate, or mixtures thereof said carboxylate being in solution in triphenylphosphite of an amount approximately equal in weight to that of said carboxylate, and (2) about 25 to 70 parts by weight of said curing system of a product of reaction at about 40 to about 100° C. of about 1 molar proportion of phosphoric acid and from about 0.3 to about 3.5 molar proportions of an aliphatic glycidyl ether, said reaction being carried out in a heatsink organic solvent that is a tris(polypropylene glycol) adduct of glycerine and is of a molecular weight of from about 640 to 770, and (3) hexahydrophthalic acid anhydride curing agent in such amount that, together with amount of said acid anhydride curing agent added to resin mixture A it is of a total amount of from 40 to 100 parts by weight of polyepoxide, and thereafter heating said mixture through a curing cycle.

6. Process of claim 5 which comprises also the step of preheating mixtures A and B separately to a temperature above ambient but below boiling temperature thereof, prior to combining said mixtures A and B, and combining heated mixtures A and B, and pouring combined mixture into a mold and heating to gel and subsequently to cure the said mixture in substantially the shape defined by the said mold.

7. Catalyst curing system composition adapted to catalyze a curing reaction between a 1,2-polyepoxide having an average of more than one 1,2-epoxyalkyl groups per molecule and a curing amount of an acid anhydride curing agent for such polyepoxide, both said polyepoxide and said anhydride being substantially colorless and transparent, said curing system composition comprising essentially (1) about 3 to 65 weight parts of a metal carboxylate curing accelerator for a curable acid anhydride-polyepoxide system said carboxylate being zinc oleate, stannous 2-ethylhexoate, sodium salicylate, zinc 2-ethylhexoate, or mixtures thereof said carboxylate being in solution in triphenylphosphite of an amount approximately equal in weight to that of said carboxylate, and (2) about 25 to 70 weight parts of a product of reaction of about 1 molar proportion of phosphoric acid and from about 0.3 to about 3.5 molar proportions of an aliphatic glycidyl ether in the presence of a solvent that is a polyglycol of molecular weight of about 500 to 1000, glycerine, or a tris polyalkylene oxide ether of a triol.

8. Mixture curable to obtain an epoxy resin comprising (A) a resin mixture consisting essentially of a liquid polyepoxide containing an average of more than one, 1,2-epoxyalkyl groups per molecule, and per hundred weight parts of polyepoxide, from 0 to 100 parts by weight of hexahydrophthalic acid anhydride curing agent for an epoxy resin and from one to thirty weight parts per hundred parts by weight of said polyepoxide, of (B) a catalyst curing system composition consisting essentially of (1) about 3 to 65 parts by weight of said curing system of a metal carboxylate curing accelerator for a curable acid anhydride polyepoxide system said carboxylate being zinc oleate, stannous 2-ethylhexoate, sodium salicylate, zinc 2-ethylhexoate, or mixtures thereof said carboxylate being in solution in triphenylphosphite of an amount approximately equal in weight to that of said carboxylate, and (2) about 25 to 70 parts by weight of said curing system of a product of reaction at about 40 to about 100° C. of about 1 molar proportion of phosphoric acid and from about 0.3 to about 3.5 molar proportions of an aliphatic glycidyl ether in the presence of a solvent that is a polyglycol of molecular weight of about 500 to 1000, glycerine, or a tris polyalkylene oxide ether of a triol and (3) hexahydrophthalic acid anhydride curing agent in such amount that, together with amount of said acid anhydride curing agent added to resin mixture A it is of a total amount of from 40 to 100 parts by weight of polyepoxide.

9. Cured epoxy resin obtained by heating through a curing cycle an intimate mixture of (A) a resin mixture consisting essentially of a liquid polyepoxide containing an average of more than one 1,2-epoxyalkyl groups per molecule, and, per hundred weight parts of polyepoxide, from 0 to 100 parts by weight of hexahydrophthalic acid anhydride curing agent and from one to thirty weight parts per hundred parts by weight of said polyepoxide, of (B) a catalyst curing system composition consisting essentially of (1) about 3 to 65 parts by weight of said curing system of a metal carboxylate curing accelerator for a curable acid anhydride polyepoxide system said carboxylate being zinc oleate, stannous 2-ethylhexoate, sodium salicylate, zinc 2-ethylhexoate, or mixtures thereof said carboxylate being in solution in triphenylphosphite of an amount approximately equal in weight to that of said carboxylate, and (2) about 25 to 70 parts by weight of said curing system of a product of reaction at about 40 to about 100° C. of about 1 molar proportion of phosphoric acid and from about 0.3 to about 3.5 molar proportions of an aliphatic glycidyl ether in the presence of a solvent that is a polyglycol of molecular weight of about 500 to 1000, glycerine, or a tris polyalkylene oxide ether of a triol and (3) hexahydrophthalic acid anhydride curing agent for an epoxy resin in such amount that, together with amount of said anhydride added to resin mixture A it is of a total amount of from 40 to 100 parts by weight of polyepoxide.

References Cited

UNITED STATES PATENTS

| | | | |
|---|---|---|---|
| 3,432,440 | 3/1969 | Shimp et al. | 260—47X |
| 3,364,159 | 1/1968 | Hecker et al. | 260—47X |
| 3,245,940 | 4/1966 | Ronay | 260—47X |
| 3,201,360 | 8/1965 | Proops et al. | 260—18 |
| 2,541,027 | 2/1951 | Bradley | 260—18UX |
| 3,496,120 | 2/1970 | Davis et al. | 260—2 |

FOREIGN PATENTS

| | | | |
|---|---|---|---|
| 903,933 | 8/1962 | Great Britain | 260—18ep |

HOSEA E. TAYLOR, Primary Examiner

C. W. IVY, Assistant Examiner

U.S. Cl. X.R.

252—431; 260—30.6, 33.2, 836, 47